(12) United States Patent
Tomoto et al.

(10) Patent No.: US 7,090,919 B2
(45) Date of Patent: Aug. 15, 2006

(54) SLIDING ELEMENT FOR SEALS AND THEIR PROCESS OF MANUFACTURING

(75) Inventors: Hideki Tomoto, Okayama (JP); Takeshi Hosoe, Okayama (JP)

(73) Assignee: Eagle Industry Co., Ltd., Tokyo (JP)

( * ) Notice: Subject to any disclaimer, the term of this patent is extended or adjusted under 35 U.S.C. 154(b) by 299 days.

(21) Appl. No.: 10/744,008

(22) Filed: Dec. 24, 2003

(65) Prior Publication Data

US 2004/0137217 A1 Jul. 15, 2004

(30) Foreign Application Priority Data

Dec. 27, 2002 (JP) .............................. 2002-381684

(51) Int. Cl.
*B32B 5/16* (2006.01)
(52) U.S. Cl. .................. 428/327; 428/323; 428/332
(58) Field of Classification Search ............... 428/327, 428/323, 332
See application file for complete search history.

(56) References Cited

U.S. PATENT DOCUMENTS

| 5,080,378 A | * | 1/1992 | Kagawa ..................... 277/404 |
| 5,538,649 A | * | 7/1996 | Demendi et al. ........... 508/101 |
| 5,990,222 A | * | 11/1999 | Watada et al. .............. 524/492 |

FOREIGN PATENT DOCUMENTS

JP        11130876 A   *   5/1999

* cited by examiner

*Primary Examiner*—David W. Wu
*Assistant Examiner*—Satya B. Sastri
(74) *Attorney, Agent, or Firm*—Arent Fox PLLC

(57) ABSTRACT

Described herein is a sliding element for seals mainly comprised of 25 to 75 weight % carbon aggregate and 20 to 50 weight % thermosetting synthetic resin binder. The element has spherical pores whose diameter is in the range of from 1 to 100 μm. The pores are isolatedly scattered in the element. The sliding element for seals is excellent both in solid and fluid lubrication properties.

11 Claims, 4 Drawing Sheets

G

SLIDING ELEMENT FOR SEALS AND THEIR PROCESS OF MANUFACTURING

BACKGROUND OF THE INVENTION

1. Field of the Invention

The present invention relates to a sliding element for seals used such as for mechanical seals and to their process of manufacturing. More particularly, the invention relates to a sliding element for seals that are excellent in lubrication property and can prevent sliding face from surface damage like wear or Blister caused such as by an adhesion or a seizure when sealing the fluid and to their process of manufacturing.

2. Description of the Related Art

Generally, carbon sliding elements are widely used as seal rings such as mechanical seals to seal the fluid. These carbon sliding elements have, in addition to solid lubrication property, moderate uneven portions on sliding surface. Accordingly, fluid film of sealed fluid can be maintained between seal sliding face of carbon sliding elements and that of mating sliding elements. Thus the carbon sliding elements show excellent lubrication property.

However, when the mechanical seals are used under a heavy load condition, though the carbon sliding elements show excellent solid lubrication property, seal sliding faces become in boundary lubrication condition and partially, by solid contact of seal sliding faces, adhesion effect may occur. Consequently, friction coefficient may be notably high and the carbon sliding elements may be short lived due to the wear. Also the sliding faces may be mirror surfaced and as Blister effect, surface blister may occur and consequently, seal function may deteriorate and sealed fluid may leak in cases.

In order to solve these problems, instead of the carbon sliding element, as a material having a high degree of hardness and strength, a hard material represented by silicon carbide may be used. And also as a mating sliding material, a hard material represented by silicon carbide with scattered pores inside may be used. This combination of mechanical seals is occasionally used. However, these mechanical seals have below mentioned problems.

First, although the silicon carbide has a high degree of hardness and is excellent in the wear resistance, it is poor in solid lubrication property. Accordingly, when the combination of silicon carbide elements are used under a heavy load condition, the sliding faces readily become mirror surfaced and while deactivation of sliding, when lubrication film between the sliding faces run out, mirror surfaced seal sliding faces may be secured to each other. This extraordinarily increases a friction coefficient of the initial running of sliding and consequently, seizure may occur in cases.

Secondly, due to the pores scattered inside the matrix of silicon carbide, the incoming sealed fluid into the sliding face may cause liquid storing effect or hydrodynamic effect during sliding, and this may reduce the anomaly or seizure of the sliding torque. However, at any cause, even for a short time, when sealed fluid is not located to a neighborhood of seal sliding face, or when relatively movable sliding faces is not under the fluid lubrication condition at the time of initial running or deactivation of sliding, it will be under the solid contact condition between the sliding faces and consequently be the same condition with the above first problem.

When under such solid contact condition, there are cases in which extreme increase of sliding heat generation occur and secondary seal portion of rubber packing or the like may be damaged by the heat, or materials dissolved in the sealed fluid may be precipitated and accumulated between the sliding faces. Consequently seal function may not stably be maintained.

On the other hand, silicon carbide sliding material with scattered pores and carbon material are combined to use as mechanical seals in cases. In this case, relative to the combination of silicon carbide sliding element, due to the solid lubrication property of carbon sliding material, the abovementioned inconvenience is modified. However, in this case, a hard material having isolated pores and concaves has a sliding motion with relatively soft carbon material. Due to this sliding motion, the hard material scratches the carbon material and this may lead to the increase of torque, further, to the wear of carbon sliding element. Also pores (concaves) on silicon carbide sliding face may be clogged by carbon wearing powder and pores on the sliding face may not maintain the stabled fluid lubrication effect in cases.

SUMMARY OF THE INVENTION

An object of the present invention is to provide a sliding element for seals which is excellent both in solid and fluid lubrication properties and to provide their process of manufacturing.

In order to achieve the abovementioned object, according to the present invention, provided is a sliding element for seals mainly comprising 25 to 75 weight % carbon aggregate and 20 to 50 weight % thermosetting synthetic resin binder, wherein pores whose diameter is in the range of from 1 to 100 μm are isolatedly scattered in the sliding element. Preferably, the pores are substantially spherical. Preferably, the pore diameter is in the range of from 2 to 100 μm. Further, the mean diameter of the pores is preferably in the range of from 3 to 70 μm, more preferably in the range of from 5 to 70 μm.

In the present invention, a pore area ratio of the pores is in the range of from 1 to 20%, preferably in the range of from 2 to 20%, more preferably in the range of from 3 to 15%.

Related to the present invention, carbon sliding element with scattered pores type is provided as follows. Source material mainly comprised of 25 to 75 weight % carbon aggregate such as graphite, carbon or mesophase and 20 to 50 weight % synthetic resin binder is blended with 1 to 30 weight % spherical resin. After mixing, kneading, and molding, this is fired to a predetermined temperature (800 to 3000° C.) causing volatilization of spherical resin inside the carbon matrix, consequently, spherical pores inside the carbon matrix are isolatedly scattered.

Related to the present invention, spherical pores are isolatedly scattered inside the carbon matrix and concaves are formed on carbon sliding face. Accordingly, related to the present invention, carbon sliding element with scattered pores type is a high efficiency sliding material for mechanical seals which shows both solid and fluid lubrication properties between the sliding faces, and even under a heavy load condition, maintains good sliding property.

That is, sliding element for seals of the present invention have following characteristics.

(1) The sealed fluid flows into the pores dispersed in the carbon matrix. The sealed fluid inside the pores, with liquid storing effect (an effect in which sealed fluid flew into pores is provided as a lubricant between the sliding faces) and hydrodynamic effect (an effect in which concaves on the sliding faces of seals, by rotating, produce dynamic fluid pressure and lubricant field) maintain fluid film. Accordingly, fluid lubrication condition, which is light loaded to sliding material, can be maintained.

(2) Carbon sliding material shows solid lubrication property, accordingly, at the time of initial running and deactivation of mechanical seals that may not be under the fluid lubrication condition, reduces a friction coefficient.

(3) Flexible carbon sliding element, having scattered pores inside, distinct from rigid material having scattered pores inside. Flexible carbon sliding element having scattered pores inside does not show notable wear of carbon material and the pore portions stably maintain the fluid lubrication property.

According to the abovementioned characteristic, sliding surface damage such as seizure caused by adhesion or sliding heat generation under a poor lubrication condition or precipitate and accumulate phenomenon of the dissolved component in sealed fluid on sliding face, occurred when using the silicon carbide material, are reduced. Further, extraordinary wear and Blister effect of carbon sliding element are restrained and prevented, and a damage of secondary seal portion of rubber packing or the like caused by sliding heat generation is also prevented. Consequently, leakage of sealed fluid can be prevented.

Also, inside the carbon matrix, spherical pores are isolatedly scattered and apparent specific gravity can be lightened to 1.55 or less. Mechanical seals also can be lightened, and for function or movement of mechanical seals, energy savings can be done. However, in order to maintain its strength as a sliding material, spherical resin for scattering pores is controlled for its size and amount of its blend, and the shore hardness of the material is required to be 70 or more.

Note that preferably the shore hardness is not more than 130, since the same problem occurs as the one of the prior art sliding element comprised of silicon carbide having scattered pores, if the shore hardness is too high.

To fulfill aboveidentified subject matter, blend ratio of spherical resin is in a range of from 1 to 30 weight % of all source materials. Then, average particle size of spherical resin is in a range of from 3 to 50 μm and particle size distribution of those is in a range of from 1 to 100 μm. When blend ratio of spherical resin is higher than the said range, or when average particle size and particle size distribution of spherical resin are higher than the said range, strength may decrease or pores may successively connected to each other causing extraordinary fluid leakage and thus, influence on sealing property of sliding element. To the contrary, when blend ratio of spherical resin is lower than the said range, or when average particle size and particle size distribution of spherical resin are lower than the said range, the blend of spherical resin may not show sufficient effect.

Spherical resin of the present invention is not particularly concerned of its composition. However, for molding temperature of molding process, starting point of softening, melting or volatilization of the resin require to be higher than the molding temperature and also for molding pressure, it requires the sphericity of the spherical resin not to be deformed and to be isolatedly scattered inside the molded carbon matrix. During firing process, component of the spherical resin, by the thermal load of firing, volatilize and disperse 90 weight % or more, and maintains almost the same particle size and blend ratio of the spherical resin inside the molded carbon matrix after the molding process, and require to be isolatedly scattered. However, when contraction of the carbon matrix by firing occurs, pores inside the carbon matrix can be contracted accordingly. Resins that satisfy the abovementioned conditions may be synthetic resins such as polybutyl methacrylate, polymethyl methacrylate, polystyrene, polyacrylic ester, polyethylene, and nylon 6. These resins may be cross-linked. According to the present invention, these resins may be used as one kind or mixture of more than one kind.

As a binder, blended synthetic resin is not particularly concerned of its composition, but during kneading process, it requires sufficient wettability with the surface of carbon aggregate and during molding process, sufficient fluidity inside the metal mold. Resins that satisfy the abovementioned conditions may be synthetic resins such as phenole resin, epoxy resin, furan resin, polyester resin, and naphthalene resin. According to the present invention, from these resins, one kind or more than one kind are picked, blended and can be used under the temperature of 120 to 200° C. for molding to be formed. Blend ratio of binder is in a range of from 20 to 50 weight % of all source materials. When this ratio is lower than the said range, the bond of aggregate become weak, to the contrary, when higher, by firing and disperse, many pores are formed and this makes it difficult to achieve the object of present invention, i.e. control of pores by the blend of spherical resin.

DETAILED DESCRIPTION OF THE INVENTION

Followings are the examples of the present invention specifically described.

EXAMPLE 1

71 weight % Non-graphitizing carbon, 25 weight % phenole resin binder and 4 weight % cross-linked polymethyl methacrylate beads (40 μm average particle size) were set for blend and after being mixed, kneaded by the kneader, and grinded, by the press process, molded at 160° C. to a seal ring preform of mechanical seal for water pump. Further, in an atmosphere of nitrogen gas, at the maximum temperature of about 1200° C., the perform was fired and the seal ring was obtained. The pore area ratio, apparent specific gravity and shore hardness of the seal ring were measured and are shown in Table 1.

In the example 1, the pore diameters of the pores were measured and were in the range of from 5 to 70 μm. Further, the mean diameter (average diameter) thereof was calculated to 30 μm. Almost all of the pores were confirmed to be substantially spherical.

The pore diameter was measured within the range of 500 μm×500 μm of the cross-section picture of the seal ring. The pore area ratio was calculated from a ratio of the pore's area in the area of 500 μm×500 μm of the cross-section picture.

EXAMPLE 2

Seal ring was produced under the same condition as example 1 except 20 μm average particle size cross-linked polymethyl methacrylate beads were used. The pore area ratio, apparent specific gravity and shore hardness of the seal ring were measured and these are shown in Table 1.

In the example 2, the pore diameters of the pores were measured and were in the range of from 3 to 25 μm. Further, the mean diameter thereof was calculated to 15 μm. Almost all of the pores were confirmed to be substantially spherical.

COMPARATIVE EXAMPLE 1

Spherical resin according to the present invention was not blended, that was, 75 weight % Non-graphitizing carbon and 25 weight % phenole resin binder were set for blend and after mixed, kneaded by the kneader, and grinded, by the press process, they were molded at 160° C. to a seal ring preform of mechanical seal for water pump. Further, in an atmosphere of nitrogen gas, at the maximum temperature of about 1200° C., the perform was fired and the seal ring was obtained. The pore area ratio, apparent specific gravity and shore hardness of the seal ring were measured and are shown in Table 1.

In the comparative example 1, the pore diameters of the pores were measured and were 2 μm or less. Further, the mean diameter thereof was calculated to 0.3 μm.

TABLE 1

| | average particle size | Comp. Ex. 1 | Ex. 1 | Ex. 2 |
|---|---|---|---|---|
| Non-graphitizing carbon | | 75 wt % | 71 wt % | 71 wt % |
| phenole resin | | 25 wt % | 25 wt % | 25 wt % |
| cross-linked polymethyl methacrylate beads | 40 μm | — | 4 wt % | — |
| | 20 μm | — | — | 4 wt % |
| pore area ratio | | 1% | 12% | 9% |
| shore hardness (HSD) | | 114 | 100 | 103 |
| apparent specific gravity | | 1.56 | 1.45 | 1.45 |

Evaluation of Friction Property

Figure 1:
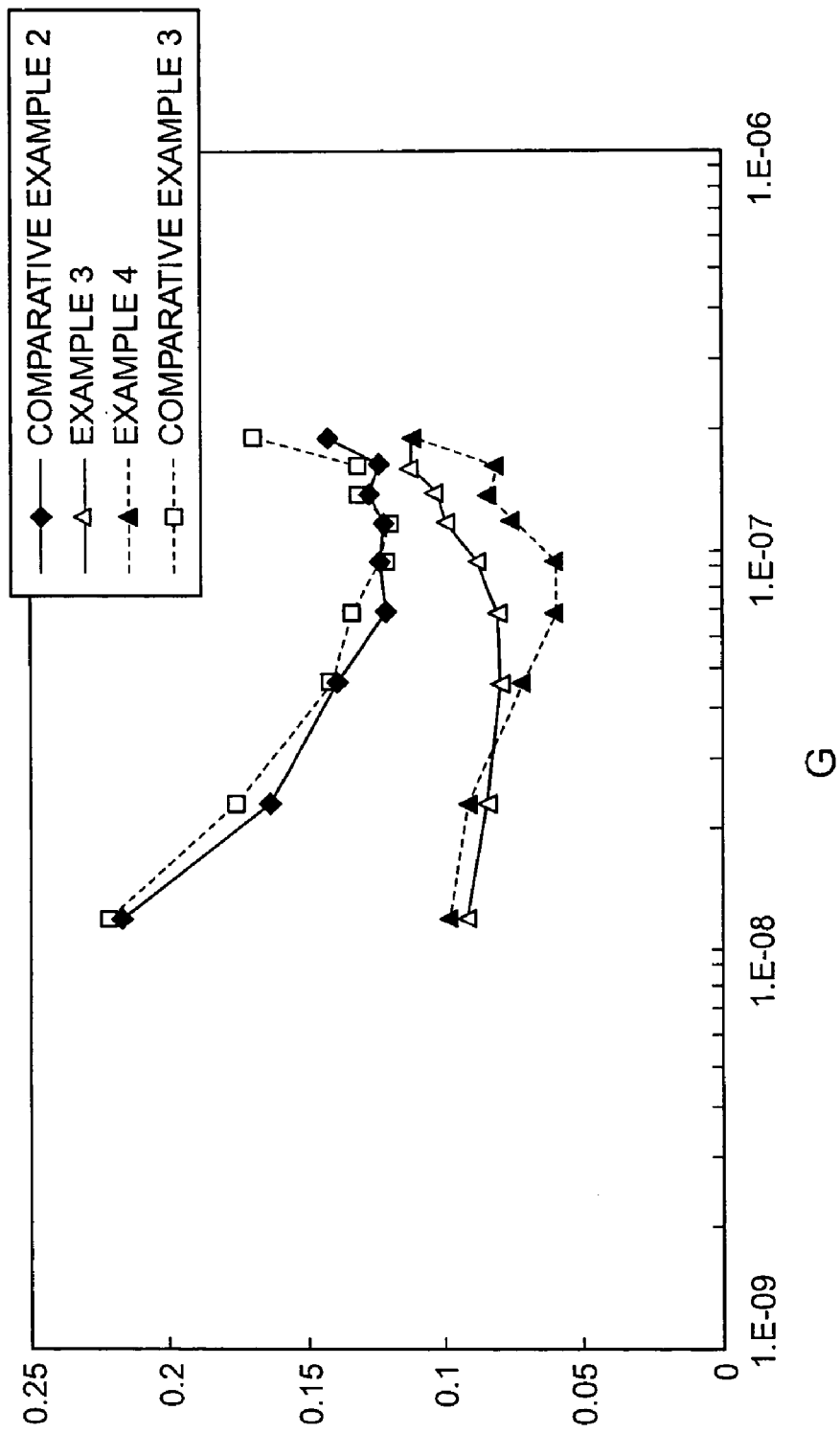
FIG. 1 is f-G diagram showing evaluation results of friction property.

As evaluation of the friction property for the materials, the mechanical seals for water pump were used under varying load and rotary speed, and the sliding torque for those were measured. The result is shown in FIG. 1 as vertical line being friction coefficient f and horizontal line being bearing property number G (=ZVb/W; Z=temperature near the sliding face, V=average circumferential speed of sliding portion, b=sliding width, W=full load).

Besides, as a mating ring for a mating sliding material, normal-pressure sintered silicon carbide A which presents dense structure and silicon carbide B which has scattered pores of 1 to 150 μm diameter, 35 to 65 μm mean diameter and 4 to 6 volume % porosity in the substrate of silicon carbide A were used. The shore hardness of the silicon carbides A and B were respectively 125 and 123.

Evaluation of friction property was done by a frictional wear tester, with 80° C. city water as sealed fluid, 500 to 8000 $min^{-1}$ rotary speed, atmospheric pressure (i.e. released) as fluid sealed pressure. Under these conditions, fluid film between the sliding faces is likely to run out and may cause vapor-liquid lubrication property environment. Combinations of sliding elements are shown in Table 2 and f-G diagram as evaluation results is shown in FIG. 1. Seal ring of example 1 and mating ring comprised of silicon carbide A are paired for example 3. Seal ring of example 2 and mating ring comprised of silicon carbide A are paired for example 4. Seal ring of abovementioned comparative example 1 and mating ring comprised of silicon carbide A are paired for comparative example 2. Seal ring of abovementioned comparative example 1 and mating ring comprised of silicon carbide B are paired for comparative example 3.

TABLE 2

| | | seal ring | mating ring |
|---|---|---|---|
| Comp. Ex. 2 | Comp. Ex. 1 | (pore area ratio 1%) | silicon carbide A (without pores) |
| Ex. 3 | Ex. 1 | (pore area ratio 12%) | silicon carbide A (without pores) |
| Ex. 4 | Ex. 2 | (pore area ratio 9%) | silicon carbide A (without pores) |
| Comp. Ex. 3 | Comp. Ex. 1 | (pore area ratio 1%) | silicon carbide B (with pores) |

From the same f-G diagram, followings can be said.

(1) Comparative example 2, a pair of carbon sliding element without scattered pores and silicon carbide without the pores likewise, has high friction coefficient f as a hole. And as bearing property number G go down, i.e. as vapor-liquid lubrication property environment become strong, there is an upward tendency in friction coefficient f. (See the symbol ♦ in FIG. 1.)

Figure 2:
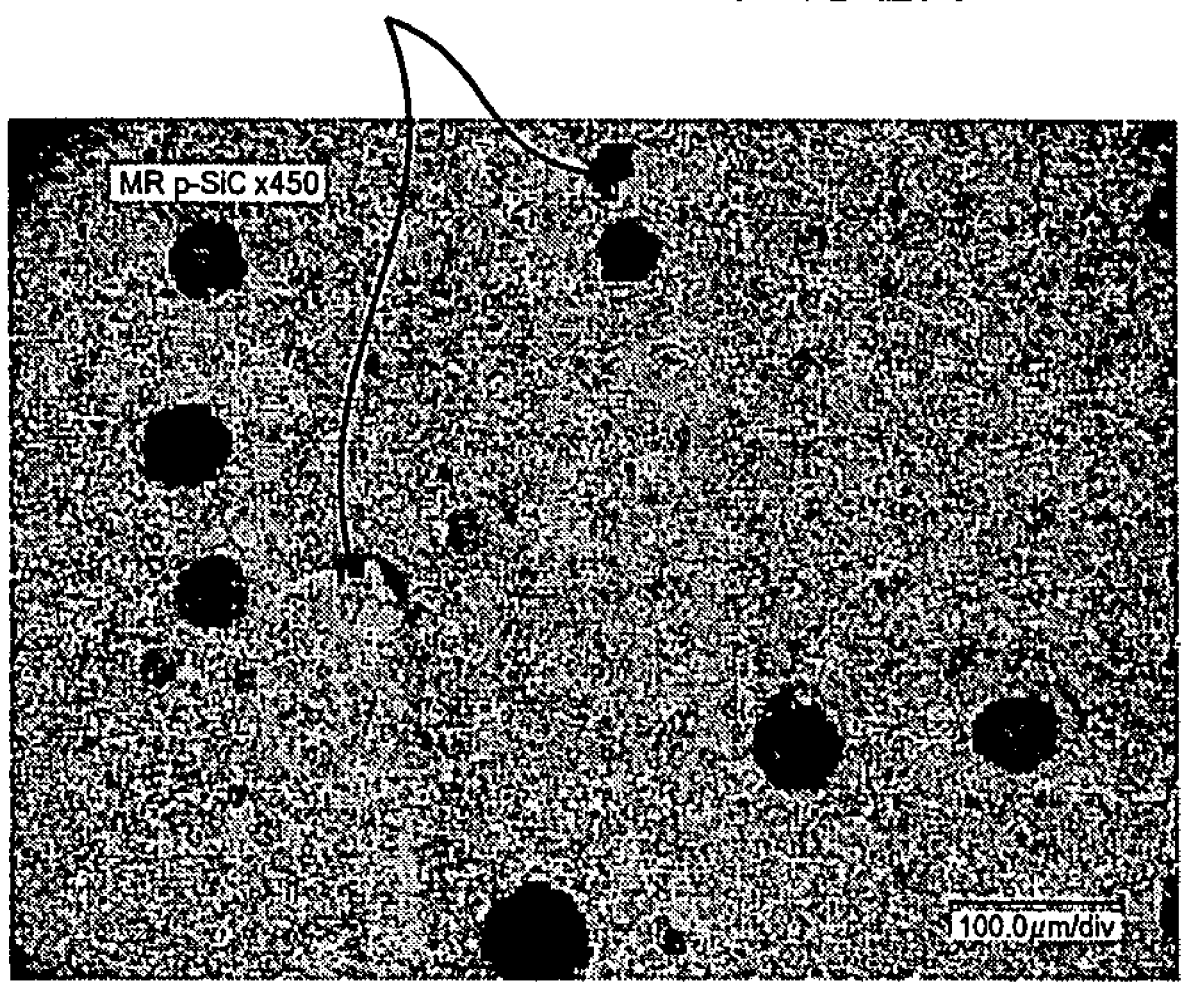
FIG. 2 is an electron microscope photograph showing the surface of mating ring in comparative example 3.

(2) Comparative example 3, a pair of silicon carbide with scattered pores and carbon sliding element without pores has high friction coefficient f as a hole. And as bearing property number G go down, i.e. as vapor-liquid lubrication property environment become strong, there is an upward tendency in friction coefficient f. (See the symbol □ in FIG. 1.) Also, as shown in FIG. 2, at the pores inside the silicon carbide element, places stored with friction powder of carbon sliding element were noticed.

According to these, fluid film retention effect by pores inside the silicon carbide element is canceled with the hang-up by deformation of flexible carbon sliding element. As a result, the reduction for friction coefficient may not conceivably obtained.

(3) In example 3 and 4, a pair of carbon sliding material with scattered spherical pores and silicon carbide without pores show, even bearing property number G go down, upward tendency in friction coefficient f is admittedly low. (See the symbol Δ and ▲ in FIG. 1.) This, even vapor-liquid lubrication property environment become strong, is conceivably caused by fluid film retention effect by the fluid stored within the pores inside the carbon matrix and solid lubrication property of carbon sliding element.

(4) According to the result of example 3, example 4 and comparative example 3, concerning seal sliding under the condition of vapor-liquid lubrication property, scattering pores inside the flexible carbon material having solid lubrication property than the rigid silicon carbide material can reduce friction coefficient f. Further, said adhesion, seizure or damage of rubber packing or the like caused by mirror surface or sliding heat generation occur at the silicon carbide which is poor in solid lubrication property can conceivably prevented.

Evaluation of Solid Lubrication Property

As evaluation of solid lubrication property for the materials, the mechanical seals for water pump were used under constant rotary speed, and the heat generation temperature near the sliding face were measured. Besides, as evaluation samples, materials that are used for abovementioned evaluation of friction property were adopted. Pairs of materials used for the evaluation are shown in Table 3. Seal ring of abovementioned example 2 and mating ring comprised of silicon carbide A are paired for example 5. Seal ring comprised of silicon carbide B and mating ring comprised of silicon carbide A are paired for comparative example 4.

TABLE 3

|  | seal ring | mating ring |
| --- | --- | --- |
| Comp. Ex. 4 | silicon carbide B(with pores) | silicon carbide A (without pores) |
| Ex. 5 | example 2 (pore area ratio 9%) | silicon carbide A (without pores) |

Figure 3:
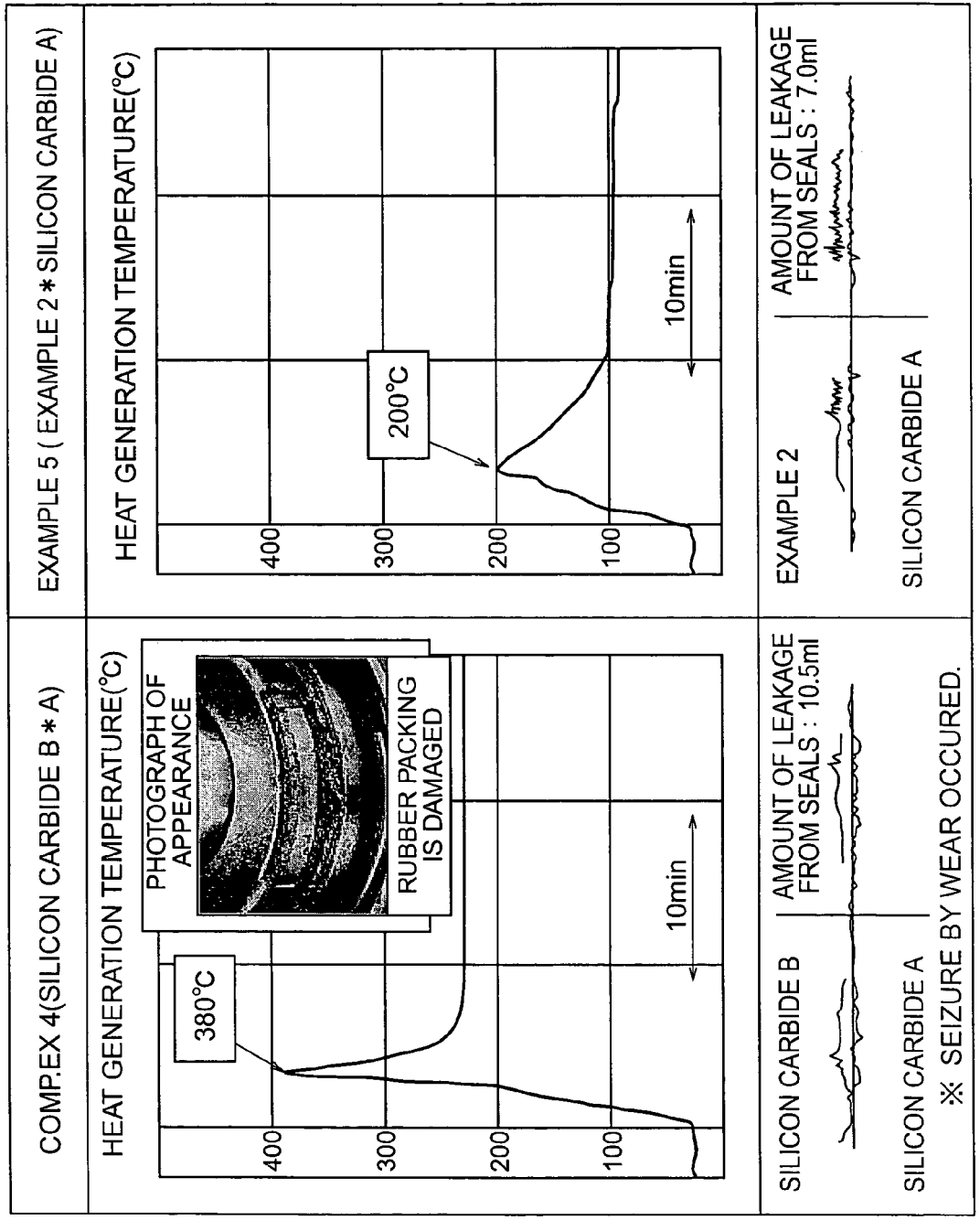
FIG. 3 is a heat generation chart (upper diagram) and a graph showing the form of sliding face (lower diagram) as evaluated results for solid lubrication property.

Evaluation of solid lubrication property was done with mechanical seal actual testing machine, at 5000 min$^{-1}$ rotary speed, atmospheric pressure (released) as fluid sealed pressure and dry environment condition (without fluid around mechanical seals) by sliding an hour. As evaluation results, setting thermocouple near the seal ring, heat generation temperature and sliding face form of evaluated samples were measured. Chart of the heat generation and the sliding face form of evaluated samples are shown in FIG. 3.

From chart of the heat generation and the sliding face form of evaluated samples shown in the same figure, followings can be said.

(1) By silicon carbide sliding element with scattered pores as in comparative example 4, immediately after the start of sliding, maximum temperature reached about 380° C. To the contrary, by carbon sliding element with scattered pores as in example 5, immediately before one hour of sliding, maximum temperature stopped at about 200° C.

(2) By silicon carbide sliding element with scattered pores as in comparative example 4, adhesive wear on sliding face was found. To the contrary, by carbon sliding element with scattered pores as in example 5, adhesive wear was not found and good condition of sliding face was maintained.

(3) By silicon carbide sliding element with scattered pores as in comparative example 4, seizure was occurred by sliding heat generation at rubber packing portion.

(4) Accordingly, even pores are scattered, when sliding condition of mechanical seal is under dry environment, carbon material with solid lubrication property may be superior to silicon carbide with poor solid lubrication property.

Evaluation of Fluid Lubrication Property

As evaluation of sliding property for the materials under approximate environment of fluid lubrication, the mechanical seals for water pump were used under the condition of constant rotary speed, and the leakage was measured. Besides, used sliding materials are the same as used for the abovementioned evaluation of solid lubrication property. Pairs of sliding materials used for the evaluation are shown in Table 4. Seal ring of abovementioned example 2 and mating ring comprised of silicon carbide A are paired for example 6. Seal ring comprised of silicon carbide B and mating ring comprised of silicon carbide A are paired for comparative example 5.

TABLE 4

|  | seal ring | mating ring |
| --- | --- | --- |
| Comp. Ex. 5 | silicon carbide B (with pores) | silicon carbide A (without pores) |
| Ex. 6 | Ex. 2 (pore area ratio 9%) | silicon carbide A (without pores) |

Figure 4:
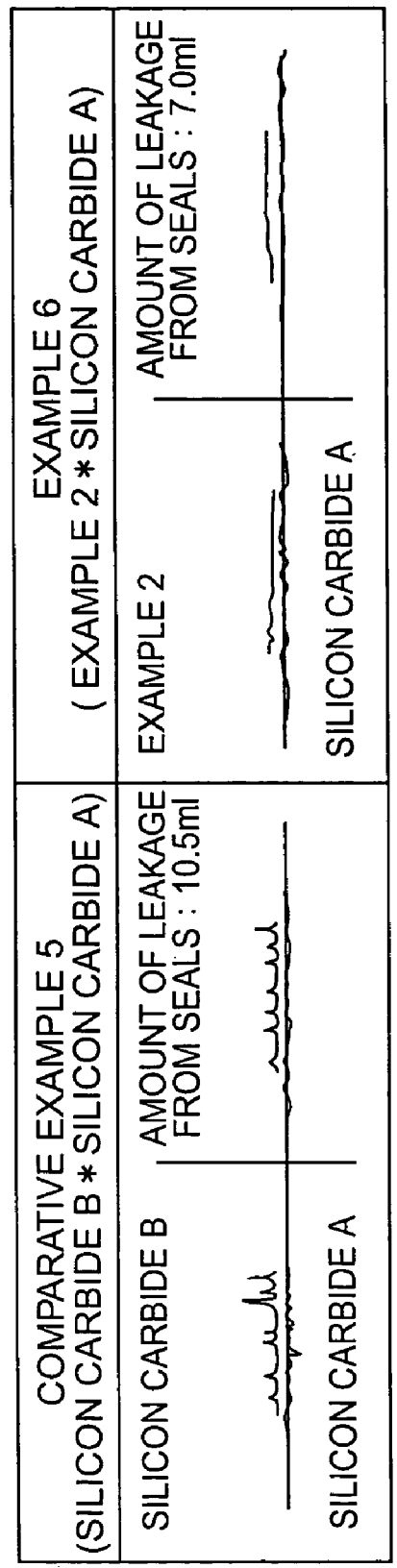
FIG. 4 is a graph showing the form of sliding face as evaluated result for fluid lubrication property.

Evaluation of fluid lubrication property was done with mechanical seal actual testing machine by LLC (long life coolant) with 50% aqueous solution 90° C. as sealed fluid, 4000 min$^{-1}$ rotary speed and sealed fluid pressure 0.2 MPa. Under the condition of 1000 hours testing time, seal performance was evaluated. As evaluation results, total amount of leakage during the 1000 hours (testing time) and sliding form after the evaluation are shown in FIG. 4.

From amount of leakage and the sliding face form after the evaluation shown in the same figure, followings can be said.

(1) By silicon carbide sliding element with scattered pores as in comparative example 5, the amount of leakage from seals was low and the condition of sliding face was good.

(2) Also by carbon sliding element with scattered pores as in example 6, the amount of leakage from seals was low and the condition of sliding face was good.

(3) Accordingly, under approximate environment of fluid lubrication, when sliding element has scattered pores, seal performances of silicon carbide material and carbon material may not show notable difference.

The effect of the present invention is as follows.

According to the present invention, sliding element for seals that are excellent both in solid and fluid lubrication properties and their process of manufacturing can be provided.

Having described specific embodiments and examples of the invention, however, the descriptions of these embodiments and examples do not cover the whole scope of the present invention nor do they limit the invention to the aspects disclosed herein, and therefore it is apparent that various changes or modifications may be made from these embodiments and examples. The technical scope of the invention is specified by the claims.

The invention claimed is:

1. A sliding element for seals comprising a carbon matrix formed by firing a matrix comprising 25 to 75 weight % carbon aggregate and 20 to 50 weight % thermosetting synthetic resin binder, wherein the sliding element further includes isolatedly scattered spherical pores inside the carbon matrix and having a diameter in a range of from 1 to 100 μm and concaves formed on a carbon sliding face.

2. The sliding element as in claim 1, wherein a mean diameter of the pores is in the range of from 2 to 100 μm.

3. The sliding element as in claim 1, wherein a pore area ratio of the pores is in the range of from 1 to 20%.

4. The sliding element for seals as in claim 1, wherein shore hardness is 70 or more and apparent specific gravity is 1.55 or less.

5. The sliding element for seals as in claim 4, wherein shore hardness is 130 or less.

6. A seal assembly comprising a sliding element as in claim 1 and a mating sliding element comprised of a harder material, which presents a more dense structure than the sliding element of claim 1.

7. The seal assembly as in claim 6, wherein the mating sliding element is comprised of normal pressure sintered silicon carbide.

8. A process of manufacturing sliding element for seals, comprising the steps of blending source material mainly comprised of 25 to 75 weight % carbon aggregate and 20 to 50 weight % thermosetting synthetic resin binder with 1 to 30 weight % spherical resin, which is a resin having a spherical form and different from the thermosetting resin binder, and after mixing, kneading, and molding the blended material to a preform, firing the preform to a predetermined temperature.

9. The process of manufacturing sliding element for seals as in claim 8, wherein particle size of said spherical resin is in the range of from 1 to 100 μm.

10. The process of manufacturing sliding element for seals as in claim 8, wherein said spherical resin is comprised of one or more resins selected from polybutyl methacrylate, polymethyl methacrylate, polystyrene, polyacrylic ester, polyethylene and nylon 6, and starting point of softening, melting and volatilization of said resin is higher than a molding temperature for said molding.

11. The process of manufacturing sliding element for seals as in claim 8 wherein said thermosetting synthetic resin binder is comprised of one or more resins selected from phenol resin, epoxy resin, furan resin, polyester resin and naphthalene resin, a molding temperature for said molding is 120 to 200° C. and a firing temperature for said firing is 800 to 3000° C.

* * * * *